United States Patent
Kitchin

(10) Patent No.: US 7,085,595 B2
(45) Date of Patent: Aug. 1, 2006

(54) POWER SAVING IN A WIRELESS LOCAL AREA NETWORK

(75) Inventor: Duncan M. Kitchin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 189 days.

(21) Appl. No.: 10/738,499

(22) Filed: Dec. 16, 2003

(65) Prior Publication Data

US 2005/0129009 A1    Jun. 16, 2005

(51) Int. Cl.
*H04M 1/00* (2006.01)

(52) U.S. Cl. .................. 455/574; 455/127.1; 455/343.1

(58) Field of Classification Search ................ 455/403, 455/412.1, 412.2, 414.1, 420, 424, 426, 13.4, 455/574, 127.1, 129, 343.1–5, 127.5; 370/389, 370/318, 336, 338
See application file for complete search history.

(56) References Cited

U.S. PATENT DOCUMENTS

| 6,014,705 | A   | * | 1/2000  | Koenck et al. ............. 709/230 |
|-----------|-----|---|---------|-------------------------------------|
| 6,368,177 | B1  | * | 4/2002  | Gabai et al. ................ 446/404 |
| 6,665,520 | B1  | * | 12/2003 | Romans ..................... 455/13.4 |
| 6,847,892 | B1  | * | 1/2005  | Zhou et al. ................. 701/213 |
| 2004/0018851 | A1 | * | 1/2004 | Koenck et al. .......... 455/550.1 |
| 2004/0153676 | A1 | * | 8/2004 | Krantz et al. ............... 713/300 |
| 2005/0138470 | A1 | * | 6/2005 | Cromer et al. ................ 714/22 |

* cited by examiner

*Primary Examiner*—CongVan Tran
(74) *Attorney, Agent, or Firm*—Schwegman, Lundberg, Woessner & Kluth, P.A.

(57) ABSTRACT

Briefly, in accordance with one embodiment of the invention, a client node transmits a wakeup notification message to a supporter node when the client node is in a higher power awake mode. The supporter node may transmit data, if any, to the client node until there is no more data to be transmitted to the client node. The supporter node then transmits a done transmitting packet to the client node when the buffer memory is empty to indicate there is no more data to be transmitted. Upon receiving a done transmitting packet, the client node may enter into a lower power sleep mode until a subsequent awake event. The wakeup notification message may be transmitted by the client node at a time or interval selected to provide a power savings to the client node.

31 Claims, 3 Drawing Sheets

POWER SAVING IN A WIRELESS LOCAL AREA NETWORK

BACKGROUND OF THE INVENTION

In a wireless local area network (WLAN), there may be one or more portable electronic devices communicating with other devices on the network. Such devices may be powered by a battery in order to provide mobile operation of the device. However, operating on a wireless local area network may entail occasional or frequent communications between devices operating on the network, for example according to a protocol of a wireless local area network communication standard. Such communication involves operation of the radio transceiver of the device, thereby consuming some amount of power and reducing the battery life of the device. One difficulty in reducing power consumption in a portable device acting as a client node on the network is that a wireless LAN connected device consumes significant power when its radio receiver is active but not receiving useful data, and the device may have no a priori knowledge of when data will arrive at the supporter node for transmission the client node device. The problem is then one of coordinating timing, such that the client node is awake, that is has its receiver active, for a shorter or the shortest possible proportion of time in order to receive data packets. It would therefore be desirable to communicate over a wireless local area network according to a protocol that provides at least some power saving for such portable electronic devices.

DESCRIPTION OF THE DRAWING FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
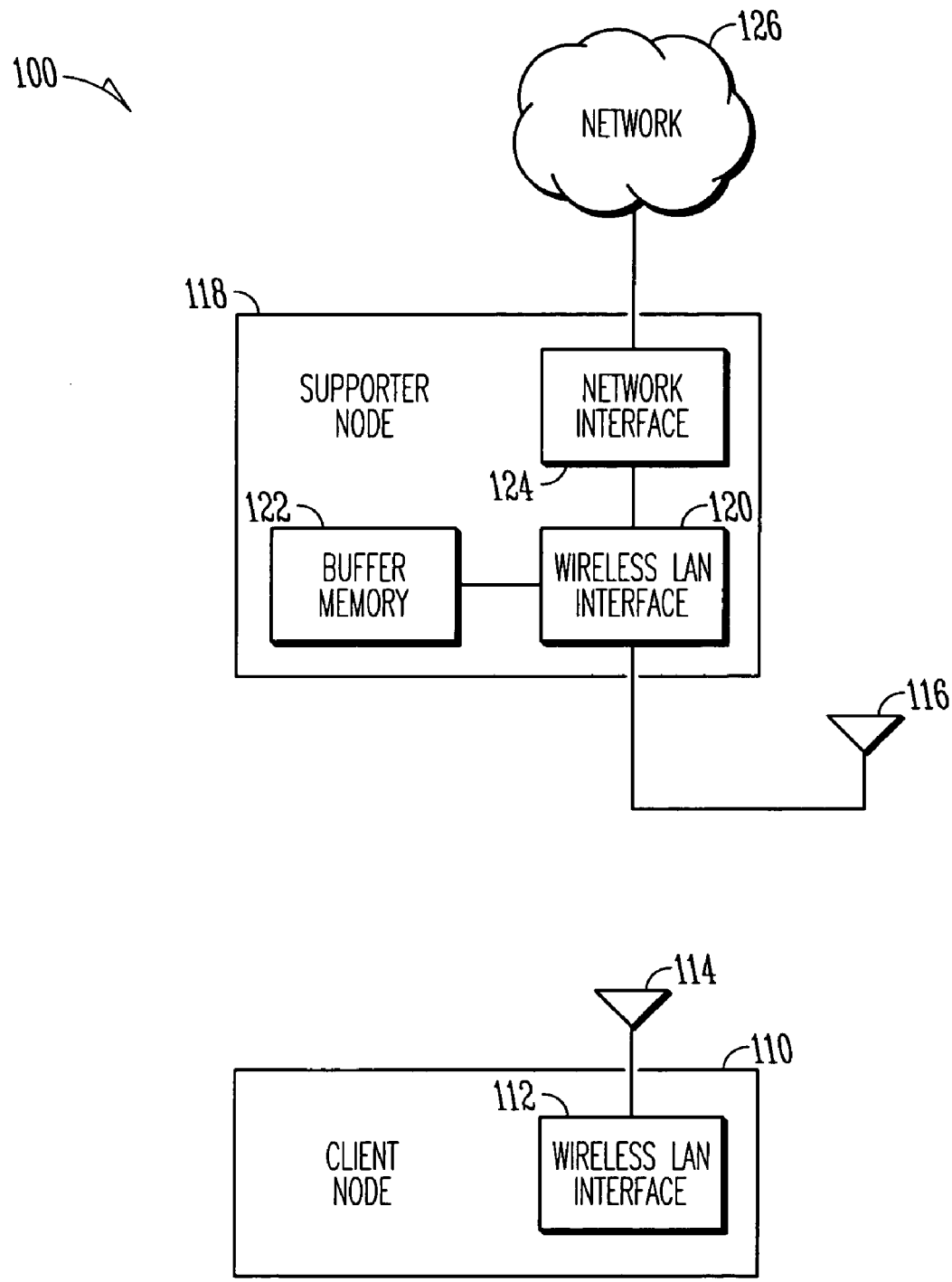
FIG. 1 is a block diagram of a wireless local area network in accordance with one embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), and the like, although the scope of the invention is not limited in this respect.

Types of wireless communication systems intended to be within the scope of the present invention include, although not limited to, Wireless Local Area Network (WLAN), Wireless Wide Area Network (WWAN), Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like, although the scope of the invention is not limited in this respect.

Referring now to FIG. 1, a block diagram of a wireless local area network will be discussed. In wireless local area network 100 shown in FIG. 1, a client node 116 may include a wireless LAN interface 112 to couple to an antenna 114. Client node 110 may be a battery powered portable electronic device, although the scope of the invention is not limited in this respect. Wireless LAN interface block 112 may include, for example, a radio-frequency transceiver and processor (not shown) to provide a radio link and media access control functions. The processor of wireless LAN interface 112 in one embodiment may comprise a single processor, or alternatively may comprise a baseband processor and an applications processor, although the scope of the invention is not limited in this respect. Wireless LAN interface 112 may further include a memory (not shown) which may include volatile memory such as DRAM, non-volatile memory such as flash memory, or alternatively may include other types of storage such as a hard disk drive, although the scope of the invention is not limited in this respect. Some portion or all of the memory may be included on the same integrated circuit as processor, or alternatively some portion or all of the memory may be disposed on an integrated circuit or other medium, for example a hard disk drive, that is external to the integrated circuit of the processor, although the scope of the invention is not limited in this respect.

Client node 116 may communicate with a supporter node 118 via a wireless communication link, where supporter node 118 may include at least one antenna 116, however one or more of supporter node 118 and client node 110 may include two or more antennas, for example to implement a spatial division multiple access (SDMA) system or a multiple input, multiple output (MIMO) system, although the scope of the invention is not limited in this respect. Supporter node 118 may include a wireless LAN interface 120 substantially similar to wireless LAN interface 112 of client node 120. Supporter node 118 may be, for example, an access point, base station, residential gateway, wireless router, another client node, and so on, although the scope of the invention is not limited in this respect. Supporter node 118 may couple with network 126 via network 126 so that client node 110 may communicate with network 126, including devices coupled to network 126, by communicating with supporter node 118 via the wireless communication link. Network 126 may include a public network such as a telephone network or the Internet, or alternatively network 126 may include a private network such as an intranet, or a combination of a public and a private network, although the scope of the invention is not limited in this respect. Communication between client node 110 and supporter node 118 may be implemented via a wireless local area network (WLAN), for example a network compliant with a an Institute of Electrical and Electronics Engineers (IEEE) standard such as IEEE 802.11a, IEEE 802.11b, and so on, although the scope of the invention is not limited in this respect. In another embodiment, communication between client node 110 and supporter node 118 may be implemented via a cellular communication network compliant with a Third Generation Partnership Project (3GPP) standard, and may implement for example one or more of a wireless local area network standard and a cellular telephone network standard, although the scope of the invention is not limited in this respect. In one embodiment, supporter node 120 may include a buffer memory 122 coupled with wireless LAN interface 120 to buffer information received via network 126 for transmission from supporter node 118 to client node 110, for example where supporter node 118 functions as an access point for client node 110 where wireless LAN 100 is arranged to operate in an infrastructure or basic service set (BSS) mode, although the scope of the invention is not limited in this respect.

Figure 2:
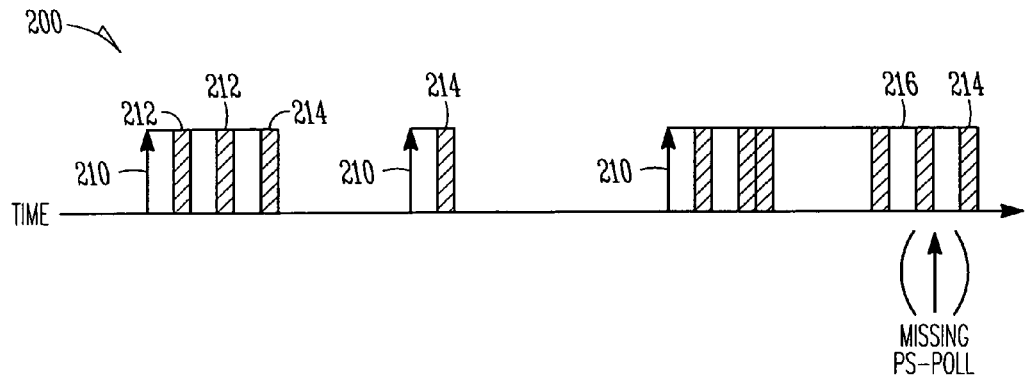
FIG. 2 is a diagram of a power saving protocol in a wireless local area network in accordance with one embodiment of the present invention.

Referring now to FIG. 2, a diagram of the operation of a power saving protocol for a wireless local area network in accordance with the present invention will be discussed. In the diagram 200 of FIG. 2, time is represented on a horizontal axis to illustrate events occurring according to a power save protocol in accordance with the present invention. In at least one embodiment, the invention may include protocols in which a wakeup policy for client node 110 may be determined by client node 110, and alternatively the invention may include one or more extensions to the power save protocol to grant advisory or control functions to supporter node 118, although the scope of the invention is not limited in this respect. In one embodiment, the invention may be implemented as an extension to a protocol in compliance with an Institute of Electrical and Electronics Engineers (IEEE) 802.11 standard, for example IEEE 802.11a, IEEE 802.11b, IEEE 802.11g, and so on, and furthermore the invention may be applicable to other wireless LAN protocols. The protocols described herein may assume a connectionless environment in which the only information available to the client and supporter is a per-packet tag indicating a priority or class of the packet, although the scope of the invention is not limited in this respect.

As shown in FIG. 2, client node 110 may transmit a wakeup notification message 210 such as a PS-Poll message to supporter node at intervals that may be defined by client node 110, wherein such wakeup notification may be independent of any beacon messages that may be transmitted by supporter node 118. After transmitting a wakeup notification 210, client node may remain awake and able to receive network traffic from supporter node 118, such as packets 212, until supporter node 118 sends a message 214 to client node 110 to indicate to client node 110 that there is no more data buffered in buffer memory 122 for client node 110, although the scope of the invention is not limited in this respect.

Thus, as shown in FIG. 2, client node 110 may not be required to wait to receive a beacon from supporter node 118 indicating that data is buffered for client node 110. Rather, client node 110 may preemptively send a wake notification message 210 such as a PS-Poll to supporter node 118 to indicate that client node 110 is awake and able to receive information from supporter node. Upon receipt of such a wakeup notification message 210, supporter node 118 may send any traffic supporter node 118 has buffered for client node 118 in buffer memory 122 of supporter node 118, subsequently followed by an indication that the buffer is empty, that is no more data is present in buffer memory 122 for client node 110. At this point, client node 110 may return back to a sleep state, for example a mode characterized by a lower power consumption level. In one embodiment, the message 214 indicating that buffer memory 122 of supporter node 118 is empty may itself contain useful data as well as the control information, although the scope of the invention is not limited in this respect.

Under certain circumstances, it is possible that buffer memory 122 at times may contain a sufficient amount of data to be transmitted to client node 110 that buffer memory 122 may be not have been completely emptied by the time of the next wakeup notification message 210 is scheduled to be transmitted by client node 110. In one embodiment of the invention, under such a condition an additional wakeup notification message 210 need not be transmitted by client node 110. Such a situation is illustrated in FIG. 2 as a missing wakeup notification message 210 at a point in time 216 at which a wakeup notification message 210 would otherwise be expected. By utilizing such a communication protocol, client node 110 may achieve a tangible amount of power saving whilst receiving a real time data stream from supporter node 118 since a wakeup notification message transmitted at a regular interval may place an upper bound on the power save induced component of packet delivery latency which may be much lower than that achieved with, for example, a beacon based method, although the scope of the invention is not limited in this respect.

In the case in which supporter node 118 may support multiple client nodes 110, for example two or more client nodes 110, the client nodes 110 may utilize different intervals for their respective wakeup message notification messages 210 interval where a client node 110 may utilize an interval suitable for itself. In one embodiment, individual client nodes 110 may determine the rate, or interval, at which it sends wakeup notification messages 210. In a client driven mode, a client node 110 may select a rate itself based on received frames in a given interval. In such a case, the behavior of client node 110 may be described in terms of an internal state that is adjusted dynamically based on the received data and its priority or class. One possible set of states and conditions for transitioning between them is shown in the state diagram of FIG. 3. In a supporter driven mode, supporter node 118 may send to client node 110 a suggested or required polling pattern, which may be, for example, based on the arrival rates or priorities of data buffered for that particular client node 110, although the scope of the invention is not limited in this respect.

Figure 3:
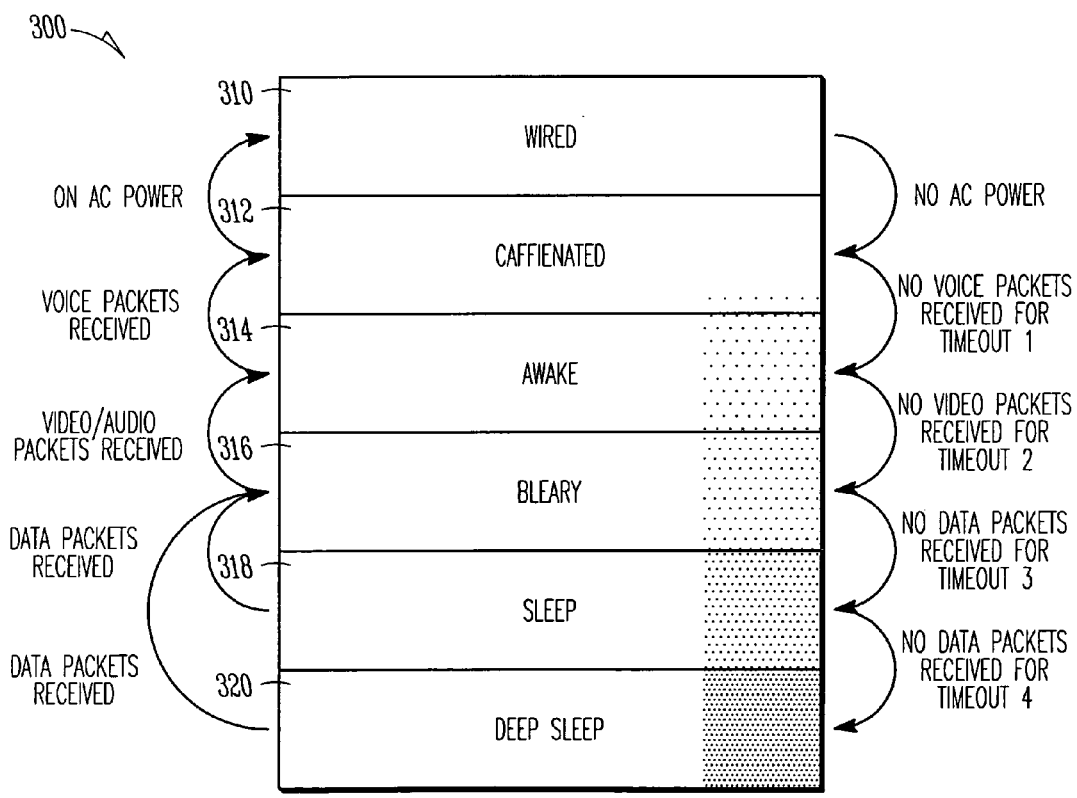
FIG. 3 is a state diagram of a power saving protocol in a wireless local area network in accordance with one embodiment of the present invention.

Referring now to FIG. 3, a state diagram of a power saving protocol in accordance with one embodiment of the invention will be discussed. The power saving method shown by state diagram 300 may be similar to that employed in current IEEE 802.11 implementations in that a client node 110 may transition to a higher power state upon receiving data, and then drop back to a lower power, deeper sleep state on increasingly long timeouts after receiving no data in a particular class. State diagram 300 may include additional power save states, for example states using preemptive polling, which may usable even when client node 110 is receiving real time data streams.

As shown in FIG. 3, state diagram 300 may include six power level states, 310 (Wired), 312 (Caffeinated), 314 (Awake), 316 (Bleary), 318 (Sleep), and 320 (Deep Sleep), which may represent a corresponding level of awakeness, or power consumption, of client node 110, although the scope of the invention is not limited in this respect. In a wired state 310, client node 110 may be continuously awake and operating. In a caffeinated state 312, client node 110 may be preemptively polling supporter node 118 by transmitting a wakeup notification message 210 at an interval of 10 ms. In an awake state 314, client node 110 may be preemptively polling supporter node 118 by transmitting a wakeup notification message 210 at an interval of 25 ms. In a bleary state 316, data transfer between client node 110 and supporter node 118 may be beacon driven, wherein client node 110 may periodically awaken for each beacon transmitted by supporter node 118. In a sleep state 318, data transfer between client node 110 and supporter node 118 may be beacon driven, wherein client node 110 may periodically awaken for each delivery traffic indication message (DTIM) beacon transmitted by supporter node 118. In a deep sleep state 320, data transfer between client node 110 and supporter node 118 may be beacon driven, wherein client node may periodically awaken once every five seconds to listen for a beacon transmitted by supporter node 118, although the scope of the invention is not limited in this respect. Transitions from one state to another may be determined by various events or timeouts, for example, from a change in alternating-current (ac) power operation, reception of voice, video, or data packets or lack of reception of voice, video, or data packets for a predetermined timeout periods, although the scope of the invention is not limited in this respect.

In an alternative embodiment, an extension to the powers saving protocol may provide an optimization by using asynchronous forced-sleep messages. In such an embodiment, if supporter node 118 is already servicing one or more client nodes 110 which are currently awake, and receives a wakeup notification message 210 from an additional client node 110, supporter node 118 may respond by sending a power-save forced sleep (PSFS) packet to the additional client node 110. A PSFS packet may indicate to the additional client node that it should go to sleep and return with another wakeup notification message 210 at a later time. Such an arrangement may allow the currently awake client nodes to receive their data and then go back to sleep upon completion of transmission of their data without requiring the additional client node 110 to remain awake while the other client nodes 110 receive their respective data, although the scope of the invention is not limited in this respect.

In a further embodiment, the PSFS message may contain an indication of a specific time in the future when targeted client node 110 is advised to return with another wakeup notification message 110. Since supporter node 118 knows how much data is buffered in buffer memory for the currently awake client nodes 110, supporter node 118 may estimate the duration needed for the other currently awake client nodes 110 to receive their respective data and to communicate a subsequent time to the targeted client node 110 sufficient for the return wakeup notification message 110, although the scope of the invention is not limited in this respect.

In an additional embodiment, if the additional, newly awakened client node 110 has data buffered for it at a higher priority than that of the other currently awake client nodes, and in particular data buffered having tighter latency constraints, supporter node 118 may instead send PSFS messages to the other currently awake client nodes 110, thereby forcing the other currently awake client nodes 110 to go to sleep whilst supporter node 118 services the additional, newly awakened client node 110. Upon completion of servicing the additional, newly awakened client node 110, the other client nodes 100 may be reawakened to complete their respective data transfer, although the scope of the invention is not limited in this respect.

In yet a further embodiment, which is not necessarily mutually exclusive with any of the other described embodiment, a preemptive wakeup notification message interval may be used by client node 110 in any convenient message, including a wakeup notification message itself. Upon receipt of a preemptive wakeup notification message, supporter node 118 may send a message to client node 110 advising client node 110 of an optimum offset time for its preemptive wakeup notification message pattern. Such an arrangement may be utilized by supporter node 118 to ensure that collisions between wake intervals occur infrequently or not at all. Such a method used by supporter node may ensure an even distribution of the times of the wakeup notification messages 210, or may alternatively take into account observed arrival rates and priorities of data destined for each client node, although the scope of the invention is not limited in this respect.

Figure 4:
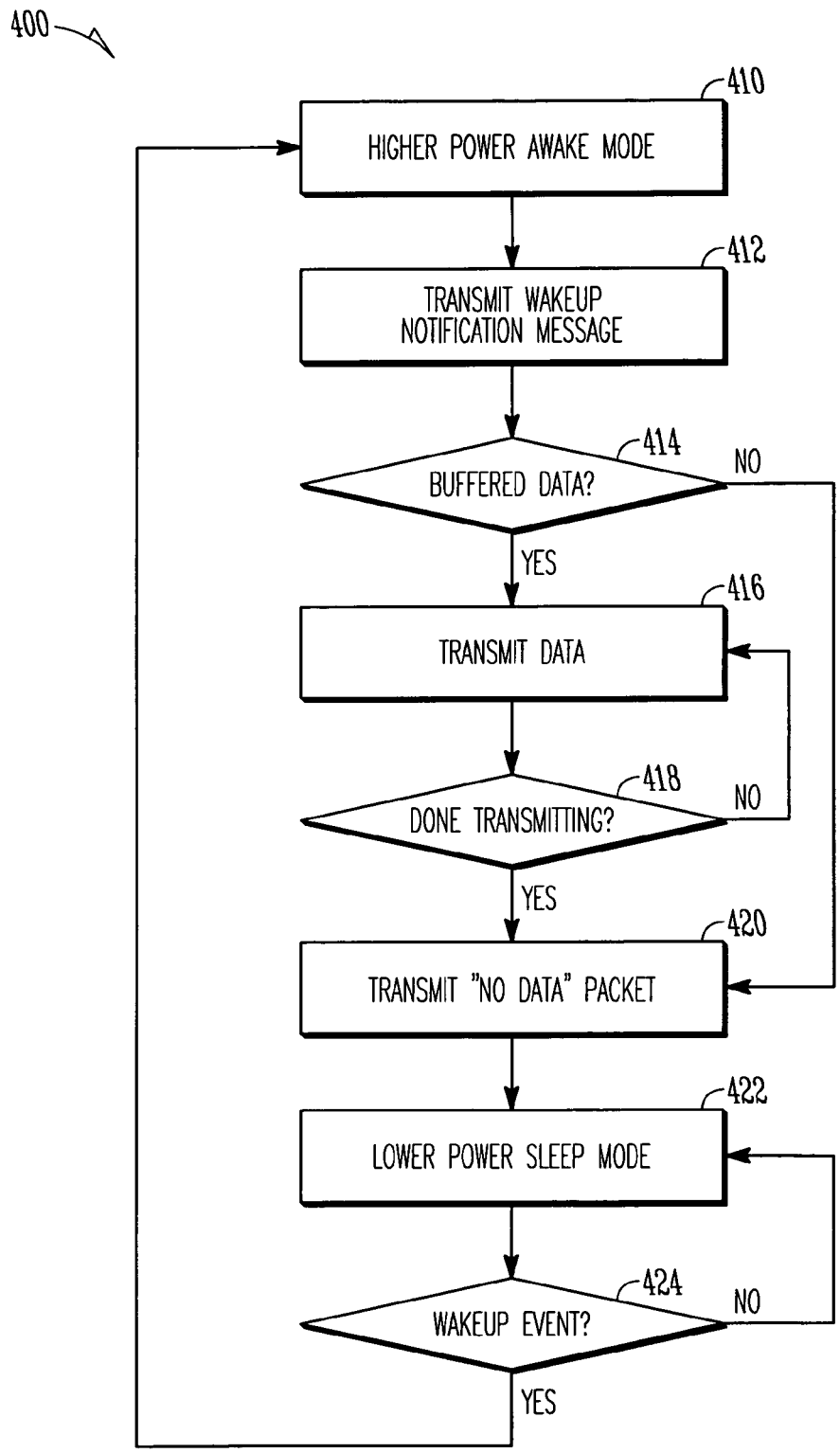
FIG. 4 is a flow diagram of a method for implementing a power save protocol in a wireless local area network in accordance with an embodiment of the present invention.

Referring now to FIG. 4, a method for implementing a power save protocol in a wireless local area network will be discussed. The method 400 as shown in FIG. 4 may implement the protocols illustrated in FIG. 2 or FIG. 3, and may be modified according to any one or more alternative embodiments or extensions of the power save protocol as discussed herein, although the scope of the invention is not limited in this respect. Client node 110 may be in a higher power awake mode 410 during which client node 110 may transmit a wakeup notification message 210 at block 412. A determination may be made a block 414 whether buffer memory 122 of supporter node 118 has any data for the client node 110 that transmitted the wakeup notification message at block 412. If there is no data in buffer memory 122 for that client node 110, supporter node 420 may transmit a "no data" packet to client node 110 at block 420 to indicate to client node 110 that there is no data in buffer memory 122 for that client node 110. Upon receiving a "no data" packet from supporter node 118, client node 110 may enter in to a lower power sleep mode at block 422, although the scope of the invention is not limited in this respect.

In the event buffer memory 122 contains data for the client node 110 that transmitted the wakeup notification message 210 at block 412, supporter node 118 may transmit the data in buffer memory 122 to client node 110 at block 416. A determination may be made at block 418 whether supporter node 118 is done transmitting the data in buffer memory 122 to client node 110, for example whether all of the data in buffer memory 122 for client node 110 has been transmitted to client node 110. In the event supporter node 118 is not done transmitting the data in buffer memory 122 to client node 110, supporter node 118 may continue to transmit data to client node 110 at block 416. As noted herein, in the event the time for an expected wakeup notification message occurs but supporter node 118 is still transmitting data to client node 110, client node 110 may optionally not transmit the expected wakeup notification message 210 as client node 110 is already awake and communicating with supporter node 118, although the scope of the invention is not limited in this respect. Upon completion of the transmission of data in buffer memory 122 to client node 110, supporter node 118 may transmit a "no data" packet to client node 110 at block 420, at which time client node may enter into a lower power sleep mode at block 422 until a subsequent wakeup event occurs at block 424, at which time method 400 may continue at block 410. A subsequent wakeup event at block 424 may be the duration of a predetermined time, optionally set by client node 110 or supporter node, or various other events as discussed herein, although the scope of the invention is not limited in this respect.

Although the invention has been described with a certain degree of particularity, it should be recognized that elements thereof may be altered by persons skilled in the art without departing from the spirit and scope of the invention. It is believed that the power saving protocol in a wireless local area network of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof, and further without providing substantial change thereto. It is the intention of the claims to encompass and include such changes.

What is claimed is:

1. A method of operating a client node in wireless network, comprising:
   transitioning from a lower-power state to a higher-power state; and
   transmitting, in response to the transitioning, a wakeup notification message to a supporter node, the supporter node being responsive to the wakeup notification message to determine whether or not data is buffered for the client node,
   wherein when there is data buffered for the client node, the method comprises receiving the buffered data until a packet is received from the supporter node indicating no more of the buffered data is available, and
   wherein when there is no data buffered for the client node, the method comprises receiving a packet from the supporter node indicating no buffered data is available.

2. The method as claimed in claim 1, wherein the transitioning from the lower-power state to the higher-power state and the transmitting the wakeup notification message are performed independently of beacon transmissions by the supporter node.

3. The method as claimed in claim 2, further comprising transitioning back to the lower-power state after receipt of the packet from the supporter node indicating no more of the buffered data is available or receipt of the packet from the supporter node indicating no data is available.

4. The method as claimed in claim 3, wherein the wakeup notification message is transmitted periodically to the supporter node.

5. The method as claimed in claim 2, wherein the wakeup notification message is transmitted periodically to the supporter node, and
wherein the method further comprising refraining from transmitting a next of the periodic transmissions of the wakeup notification message when the client node is currently receiving the buffered data from the supporter node.

6. The method as claimed in claim 5, further comprising transitioning to one of a plurality of power saving states depending on a time-interval between the periodic transmissions of the wakeup notification message,
wherein the client node transitions to a lower-power state for a longer time-interval, and transitions to a higher-power state for a shorter time-interval.

7. The method as claimed in claim 2 wherein the client node uses two or more antennas implementing spatial diversity to receive the buffered data from the supporter node.

8. The method as claimed in claim 2 further comprising receiving a power save message from the supporter node in response to the wakeup notification message, the power save message instructing the client node to transition back to the lower-power state when the supporter node is servicing one or more other client nodes and is unable to transmit buffered data to the client node.

9. The method as claimed in claim 8 wherein the power save message indicates a time in the future when the client node is to transmit another wakeup notification message to possibly receive buffered data, and
wherein the supporter node estimates a duration to complete the services of the one or more other client nodes to determine the time in the future.

10. A method of operating a supporter node in a wireless network, comprising:
buffering data for a client node when the client node is in a lower-power state;
receiving a wakeup notification message transmitted from the client node indicating that the client node has transitioned from the lower-power state to a higher-power state;
in response to the receipt of the wakeup notification message, either transmitting the buffered data to the client node when there is buffered data for the client node or transmitting a packet to the client node indicating no data is available for the client node when there is no buffered data for the client node.

11. A method as claimed in claim 10, wherein the client node transitions from the lower-power state to the higher-power state and transmits the wakeup notification message independent of beacon transmissions by the supporter node.

12. A method as claimed in claim 11, wherein the client node transitions back to the lower-power state after receipt of the buffered data from the supporter node or after receipt of the packet from the supporter node indicating no data is available.

13. A method as claimed in claim 12, wherein the wakeup notification message is transmitted periodically to the supporter node by the client node.

14. A method as claimed in claim 11, wherein wherein the wakeup notification message is transmitted periodically by the client node to the supporter node, and
wherein the client node refrains from transmitting a next of the periodic transmissions of the wakeup notification message when the client node is currently receiving the buffered data from the supporter node.

15. A method as claimed in claim 14, wherein the client node transitions to one of a plurality of power saving states depending on a time-interval between the periodic transmissions of the wakeup notification message by the supporter node, and
wherein the client node transitions to a lower-power state for a longer time-interval, and transitions to a higher-power state for a shorter time-interval.

16. The method as claimed in claim 11 wherein the client node uses two or more antennas implementing spatial diversity to receive the buffered data from the supporter node.

17. The method as claimed in claim 11 further comprising transmitting a power save message to the client node in response to the wakeup notification message, the power save message instructing the client node to transition back to the lower-power state when the supporter node is servicing one or more other client nodes and is unable to transmit buffered data to the client node.

18. The method as claimed in claim 17 wherein the power save message indicates a time in the future when the client node is to transmit another wakeup notification message to possibly receive buffered data, and
wherein the method further comprises the supporter node estimating a duration to complete the services of the one or more other client nodes to determine the time in the future.

19. A client node, comprising:
a wireless local area network interface comprising a transceiver to transmit a wakeup notification message to a supporter node in response to a transition from a lower-power state to a higher power state, the transceiver to receive data from the supporter node when there is buffered data for the client node, until a packet is received from the supporter node indicating no more of the buffered data is available,
wherein when there is no data buffered for the client node at the supporter node, the interface is to receive a packet from the supporter node indicating no buffered data is available.

20. The client node of claim 19, wherein the client node transitions back to the lower-power state after receipt of the packet from the supporter node indicating no more of the buffered data is available or after receipt of the packet from the supporter node indicating no data is available.

21. The client node of claim 19, wherein the wireless local area network interface enters the lower-power state after receiving the packet from the supporter node indicating that no data is available, and
wherein the client node transitions from the lower-power state to the higher-power state and transmits the wakeup notification message independent of beacon transmissions by the supporter node.

22. The client node as claimed in claim 21 further comprising two or more antennas coupled to the interface to implement spatial diversity to receive the buffered data from the supporter node.

23. The client node as claimed in claim 21 wherein the interface receives a power save message from the supporter node in response to the wakeup notification message, the power save message instructing the client node to transition back to the lower-power state when the supporter node is servicing one or more other client nodes and is unable to transmit buffered data to the client node.

24. A supporter node, comprising:
a wireless local area network interface, comprising a transceiver to receive a wakeup notification message from a client node and to transmit buffered data to the client node when there is buffered data available for the client node and to transmit a packet to the client node indicating no data is available when there is no data buffered for the client node,
wherein the wakeup notification message indicates that the client node has transitioned from a lower-power state to a higher-power state.

25. A supporter node as claimed in claim 24, further comprising a buffer memory to store the buffered data for the client node while the client node is in the lower-power state,
wherein the client node transitions back to the lower-power state after receipt of the buffered data from the supporter node or after receipt of the packet from the supporter node indicating no data is available, and
wherein the client node transitions from the lower-power state to the higher-power state and transmits the wakeup notification message independent of beacon transmissions by the supporter node.

26. The client node as claimed in claim 25 wherein the power save message indicates a time in the future when the client node is to transmit another wakeup notification message to possibly receive buffered data, and
wherein the supporter node estimates a duration to complete the services of the one or more other client nodes to determine the time in the future.

27. The supporter node of claim 25 wherein the client node uses two or more antennas implementing spatial diversity to receive the buffered data from the supporter node.

28. The supporter node of claim 25 wherein the transceiver transmits a power save message to the client node in response to the wakeup notification message, the power save message instructing the client node to transition back to the lower-power state when the supporter node is servicing one or more other client nodes and is unable to transmit buffered data to the client node.

29. The supporter node of claim 28 wherein the power save message indicates a time in the future when the client node is to transmit another wakeup notification message to possibly receive buffered data, and
wherein the supporter node estimating a duration to complete the services of the one or more other client nodes to determine the time in the future.

30. A supporter node system, comprising:
an omnidirectional antenna; and
a wireless local area network interface to couple to said omnidirectional antenna, wherein said interface includes a transceiver to receive a wakeup notification message from a client node and to transmit buffered data to the client node when there is buffered data available for the client node and to transmit a packet to the client node indicating no data is available when there is no data buffered for the client node,
wherein the wakeup notification message indicates that the client node has transitioned from a lower-power state to a higher-power state.

31. The supporter node system of claim 30, further comprising a buffer memory to store the buffered data for the client node while the client node is in the lower-power state,
wherein the client node transitions back to the lower-power state after receipt of the buffered data from a supporter node or after receipt of the packet from the supporter node indicating no data is available, and
wherein the client node transitions from the lower-power state to the higher-power state and transmits the wakeup notification message independently of beacon transmissions by the supporter node.

* * * * *